Figures 1, 2:
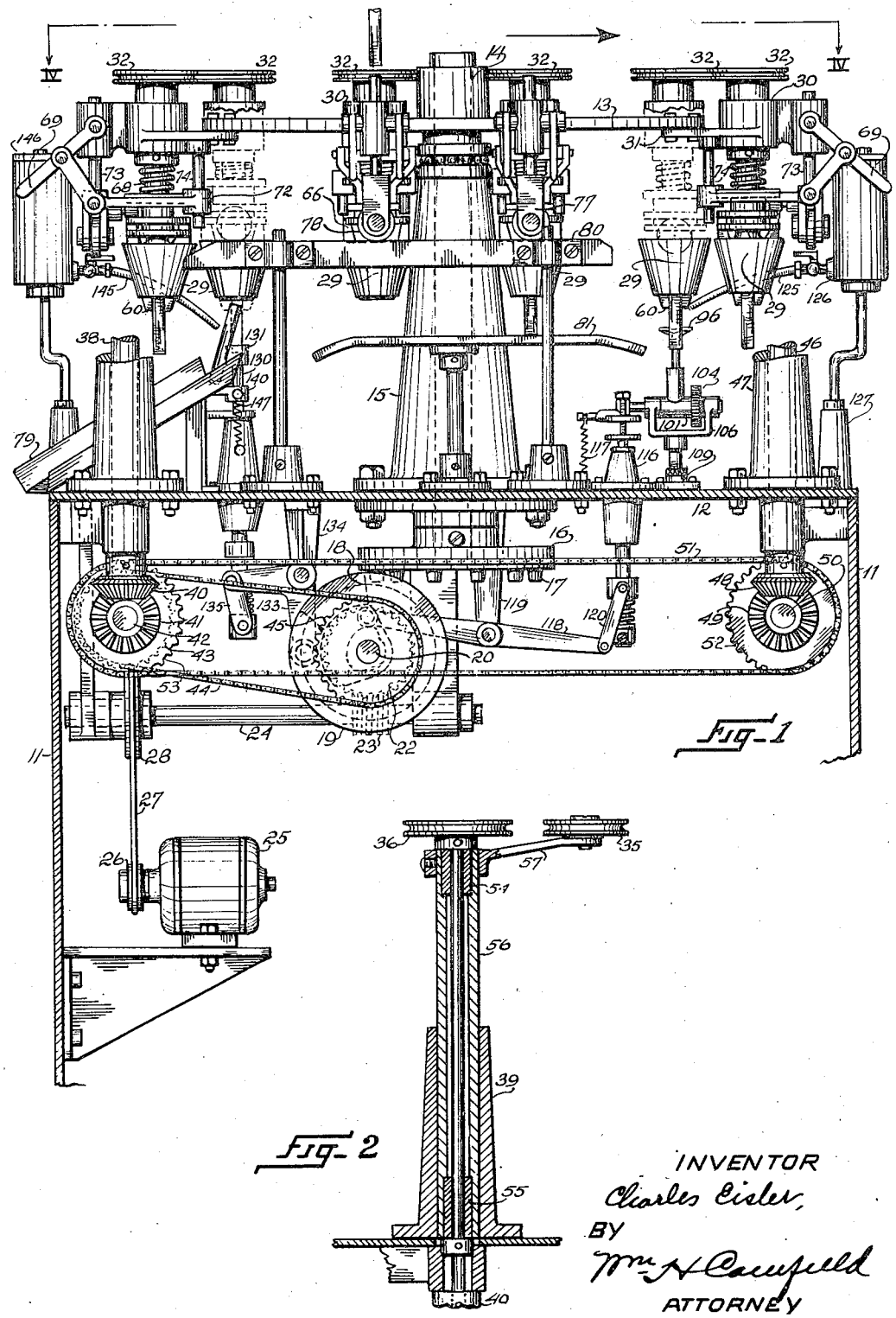

Aug. 24, 1948. C. EISLER 2,447,568
MACHINE FOR FORMING BOTTOMS ON GLASS TUBES
Filed Jan. 20, 1944 5 Sheets-Sheet 1

INVENTOR
Charles Eisler,
BY
Wm H Caufield
ATTORNEY

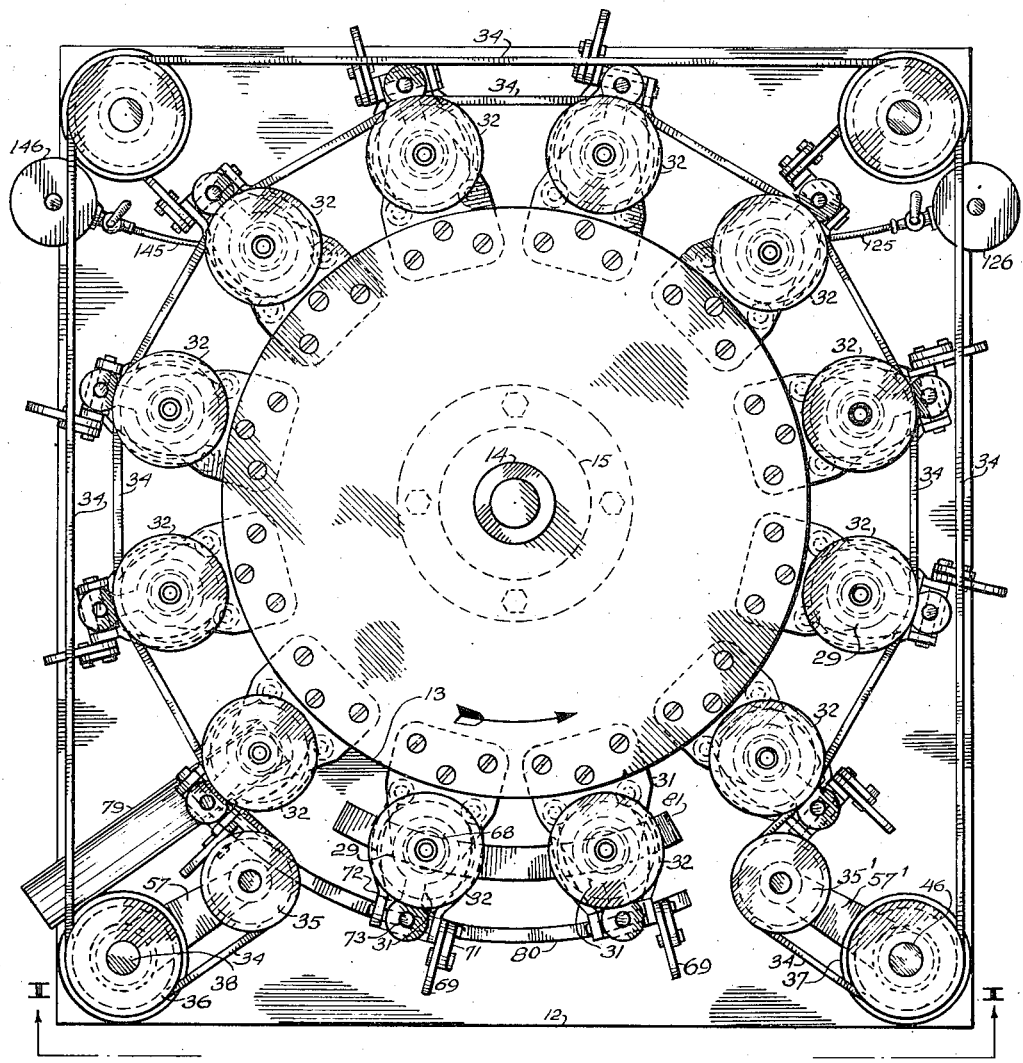

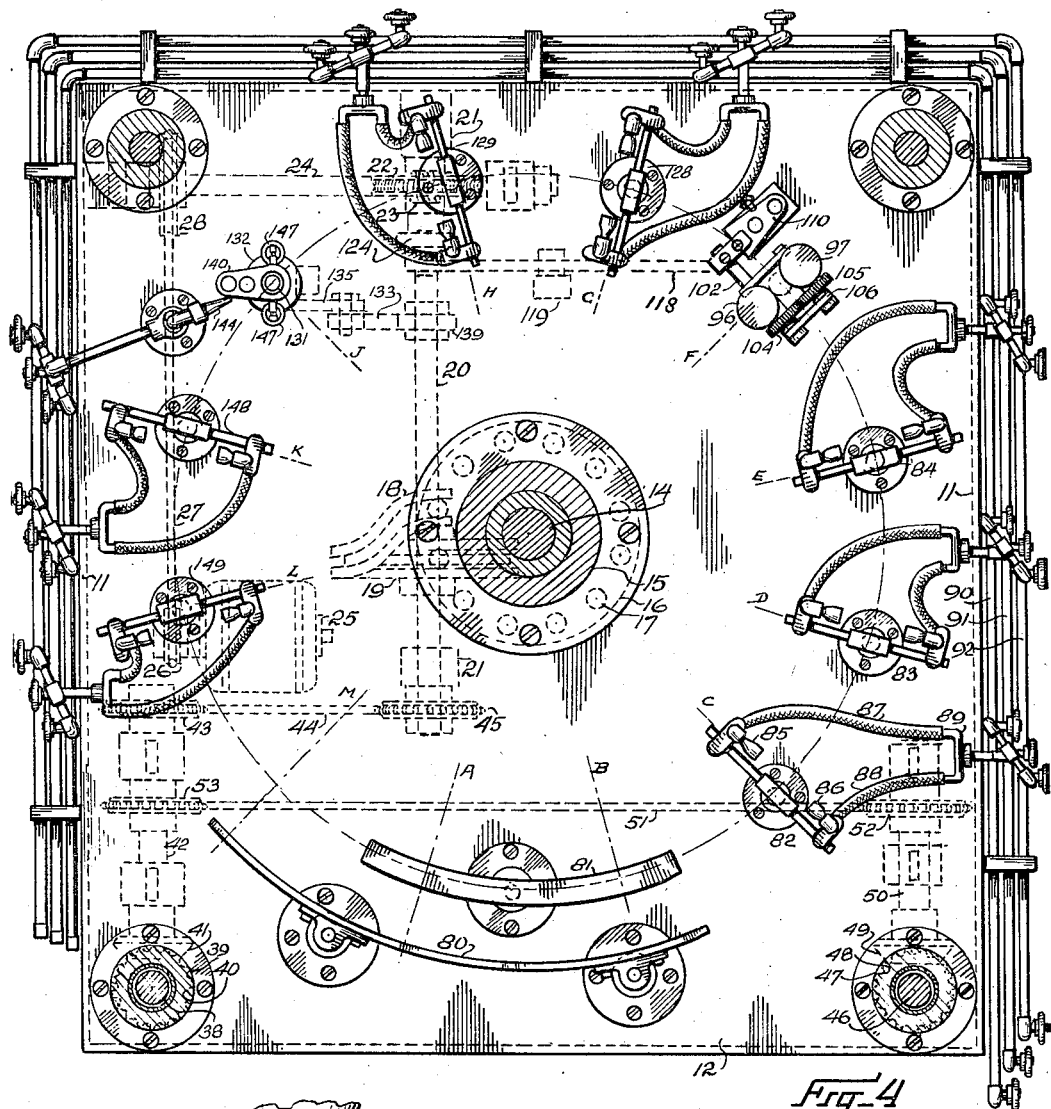
Aug. 24, 1948.  C. EISLER  2,447,568
MACHINE FOR FORMING BOTTOMS ON GLASS TUBES
Filed Jan. 20, 1944  5 Sheets-Sheet 3
INVENTOR
Charles Eisler,
BY
Wm. J. H. Caufield.
ATTORNEY

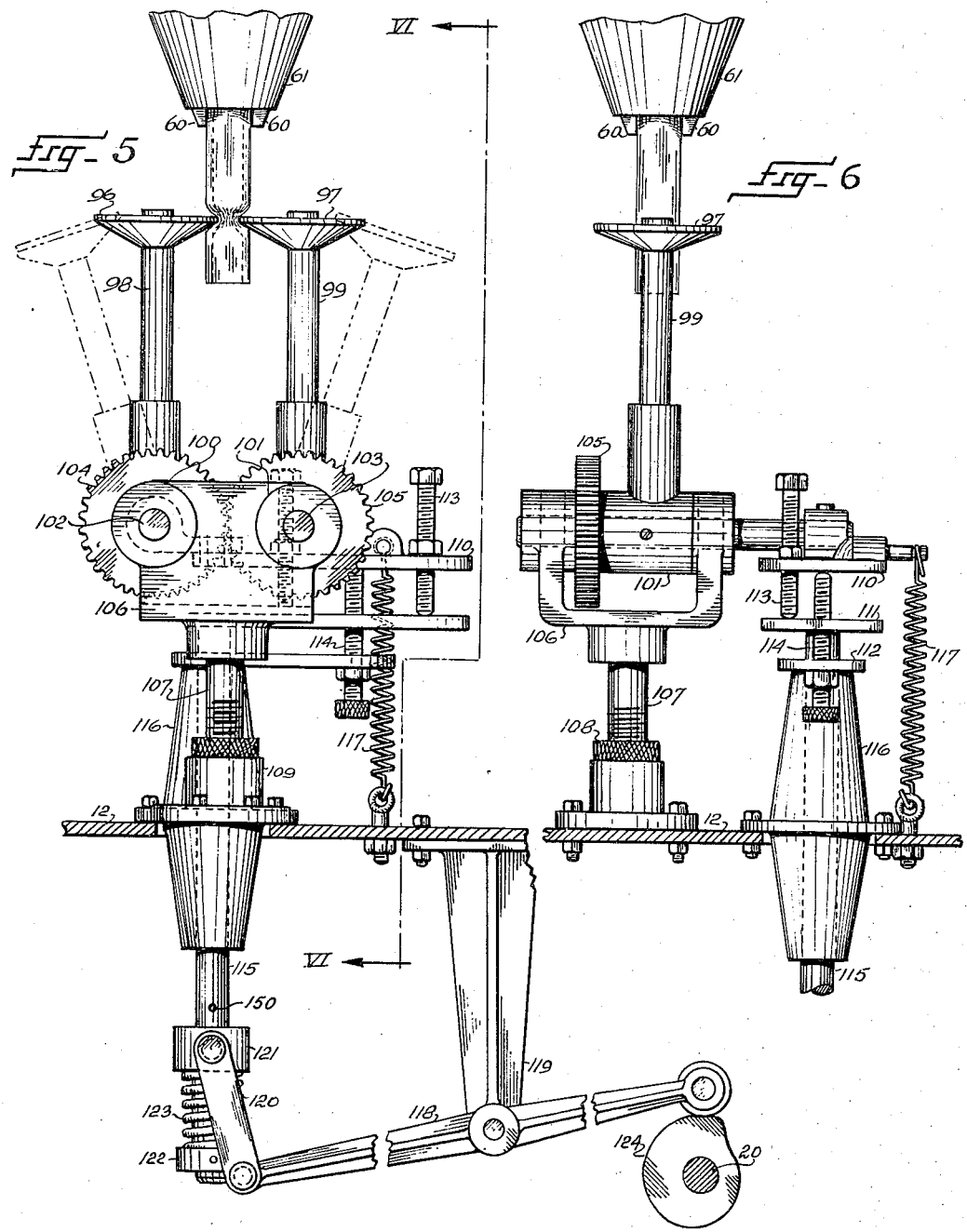

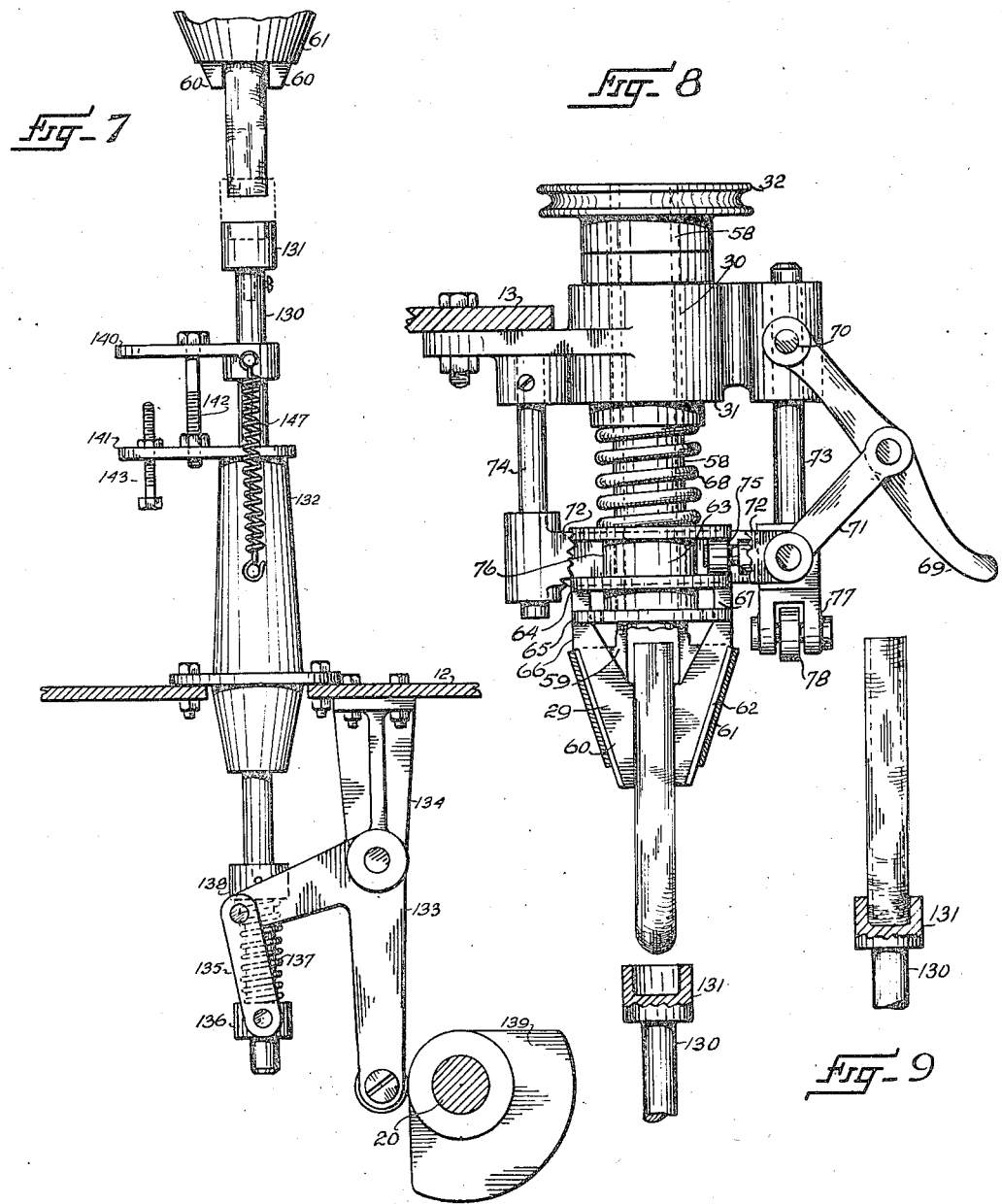

Patented Aug. 24, 1948

2,447,568

UNITED STATES PATENT OFFICE 2,447,568

MACHINE FOR FORMING BOTTOMS ON GLASS TUBES

Charles Eisler, South Orange, N. J.

Application January 20, 1944, Serial No. 519,060

1 Claim. (Cl. 49—7)

This invention relates to an improved machine for submitting a series of tubular glass blanks to successive operations of mechanical devices and flame means and thereby forming each tube with a bottom of desired shape without the employment of any manually operated means.

The improved machine is constructed to heat and form the bottoms of glass blanks in proper sequence and is especially adapted to form bottoms requiring precise shapes such as the glass pistons of syringes and the like in which perfectly flat bottoms are necessary. The machine also produces bottoms of proper thickness in the forming in order that the internal stresses are not present, which stresses are manifest in cooling by cracking of the glass.

The invention is illustrated in the accompanying drawings, in which: Figure 1 is an elevation of the machine viewed from the operating side taken on line I—I of Fig. 3, some parts being shown in dotted lines in order to avoid obscuring other parts. Figure 2 is a detail which is only partially shown in Figure 1 in order to avoid blanketing of essential parts described. Figure 3 is a top view of the machine with special emphasis on the means employed for rotating the chucks. Figure 4 is a top view of the supporting table of the machine showing the appliances carried thereby taken on line IV—IV of Fig. 1. Figure 5 illustrates the pre-forming tools and the actuating means therefor. Figure 6 is another view of the pre-forming tools taken on the line VI—VI in Figure 5. Figure 7 illustrates the bottom-forming mold and the actuating means therefor. Figure 8 shows a glass tube in its chuck just prior to the bottom-forming operation. Figure 9 shows the glass tube with the bottom formed just prior to its disengagement from the bottom forming tools. Figure 10 illustrates the arrangement of burners used in the machine with relation to each other and the tube, and Fig. 11 is a fragmentary elevational view taken on line XI—XI of Fig. 10.

Referring to Figure 1 it is seen that the machine comprises the base 11 and the top plate 12 on which is installed the spider 13, keyed on the vertical shaft 14 which rotates in the support 15. The spider is driven in a rotative step-by-step movement. On the shaft 14, below the table plate, is keyed the indexing disc 16 provided with the indexing pegs 17 which are successively engaged by the shoe 18 of the barrel cam 19. The barrel cam 19 is mounted on the main drive shaft 20 journalled in the supports 21 secured on the table plate or to any other part of the machine suitable. On the drive shaft 20 is mounted the worm wheel 22 driven by the worm 23 on the shaft 24, the shaft 24 being driven by the motor 25 by means of the pulley 26, the belt 27 and the pulley 28 secured on the shaft 24.

The spider 13 carries the usual form of chucks 29 or other preferred form of chuck which are rotatable in the chuck bearings 30 of the chuck support 31 secured to the spider. Rotation of the chucks is effected by the chuck pulleys 32 keyed on the chuck spindles 58, the pulleys 32 being actuated by the belt 34 passing over the idler pulleys 35, 35' to the driving pulleys 36 and 37. The driving pulley 36 is mounted on the vertical shaft 38 rotatable in the support 39, the shaft 38 having the bevel gear 40 meshing with the bevel gear 41 on the horizontal shaft 42 (Figs. 1, 2 and 4). The shaft 42 has the sprocket gear 43 secured thereon, driven by sprocket chain 44 from sprocket gear 45 keyed on the main shaft 20. Driving pulley 37, mounted on the vertical shaft 46 rotatable in the support 47 has the bevel gear 48 meshing with the bevel gear 49 on shaft 50 which is driven by the chain 51 over sprocket gear 52 on shaft 50 and sprocket gear 53 on shaft 42. The driving pulleys 36 and 37 thus work in unison.

It should be noted that the vertical shafts on which are keyed the driving pulleys are journalled in the bearings 54 and 55, inside the vertical sleeve 56 fixed in the support 39 and that the bracket 57 which carries the idler pulley 35 is secured to the sleeve 56. The construction illustrated by Fig. 2 is the same for shaft 46 as it is for shaft 38; bracket 57' carries sleeve 56.

The machine illustrated in the drawings is provided with twelve chucks. It will be understood, however, that any desired number of chucks may be employed, the number of chucks and consequently the number of stations which they have to pass depending largely upon the heating requirement of the glass tubes.

The chucks as shown in Figure 9, comprise the chuck spindle 58 integral with the cone-shaped jaw seats 59 in the radial slots of which the jaws 60 are slidably mounted. The jaws are confined by the jacket 61 encompassing and secured to the conical jaw seat. The jaws 60, the outer edges 62 of which are dovetailed into the outer surface of the jacket 61 can be lifted by raising the sleeve 63, slidable on the chuck spindle 58, and provided with the rims 64 and 65, the last-named being provided with radial slots which allow the neck portion 66 of the grip jaws to slide radially inward and outward, the jaws being held in suspended relation to the sleeve by the ledges of the heads 67. The jaws of the chuck can be opened or closed by raising or lowering the sleeve 63 against the influence of the compression spring 68, this being effected by the hand lever 69, pivoted as at 70 in the chuck support, and connected by the link 71 with the bracket 72 slidable on the vertical guide rods 73 and 74. The bracket 72 has the roller 75 engaging the groove 76 of the sleeve 63.

By means of the lever 69 the chuck can thus be opened or closed manually at any time, at or between stations, whenever it is found necessary to remove the glass tube for inspection or rejection during the burner adjustment period of the initial stage of the operation. Thereafter, however, the opening and closing of the chucks should be performed by automatic means at the pre-determined times and stations to which end the bracket 72 is provided with the depending clevis 77 in which is journalled the lift roller 78.

Referring to Figure 4, it will be seen that each chuck has to pass and stop at twelve stations designated by A B, C, D, E, F, G, H, J, K, L, M, of which M is the unloading station at which the bottom-forming of the glass tube has been accomplished and the tube is released from the chuck into the receiving chute 79. A is the loading station at which stop the new tube is inserted into the chuck. Just before reaching the unloading station M the roller 78 has contacted the rising slope of the lift rail 80 whereby the sleeve 63 is raised and the jaws opened and on reaching the station M the tube is released. The chuck then proceeds in the direction of the arrow and is arrested by the barrel cam indexing device above described at the loading station A. As the roller 78 is still raised by the rail 80 the chuck remains open; the new tube then is inserted from above through the hollow chuck spindle and passes between the jaws until it is arrested and rests upon the rail 81 which insures the proper alignment of the open bottom of the tube with reference to the forming tools. Immediately after passing the station B the roller 78 reaches the descending slope of the lift rail and the jaws of the chuck close and clamp the tube in position.

On reaching the station C, the tube is preheated by the burner 82 and then passes to the burners 83 and 84, at stations D and E respectively, which heat the glass tube to the required degree of red hot plasticity.

The burners 82, 83 and 84, illustrated in Figure 10, have the opposed fish-tail jets 85 and 86 which are preferably positioned cross-wise to each other, as shown in Fig. 11, and diagonally to the axis of the tube so as to uniformly heat a considerable section of the tube. The burners are supplied with gas and air by the gas feed pipes 87 and 88 which connect with manifold 89 and from there with the usual gas ducts 90, 91 and 92. The burners are spaceable on the bar 93 and adjustable as to height by the vertical shaft 94 slidable on the support 95.

The above description applies to all burners used on this machine, the intensity and force of the flame being a matter of judgment on the part of the operator.

After passing station E at which the lower part of the tube has been brought to red heat, the tube is passed on to the pre-forming appliance or tool, by means of which a constriction is impressed on the glass tube at some distance from the bottom of the tube, as a preliminary to melting off the end of the tube. The preforming tool, illustrated in Figures 5 and 6 comprises the two freely-rotatable idler rollers 96 and 97 rotatable on the shafts 98 and 99 respectively, these shafts being vertically positioned in the hubs 100 and 101, which are oscillated toward and from the glass tube. The hubs are secured on the shafts 102 and 103 respectively on which shafts are keyed the two intermeshing gears 104 and 105 respectively. The shafts 102 and 103 are journaled in the bracket 106 which is vertically adjustable by the screw and nut 107 and 108 in the support 109 secured to the table 12.

The shaft 102 which extends beyond the hub of the bracket 106 is keyed to the plate 110 of the usual change-speed shifting device which includes the plates 111 and 112 and the adjustable contact screws 113 and 114. The plate 112 is mounted on the vertical shaft 115 slidable in the support 116. The oscillating plate 110 after lifting is retracted by the coil spring 117. The shaft 115 is raised and lowered by the lever 118 fulcrumed in the support 119, link 120 connecting the lever with the sliding collar 121 which is held in resilient relation to the fixed collar 122 by the coil spring 123. The shaft 115 has a pin 150 fixed thereto and adapted to be engaged by the collar 121 on the upward movement thereof to actuate the shaft 115 upwardly responsive to upward movement of the collar by the means previously described. The lever 118 is actuated by the cam 124 on the main drive shaft 20.

By means of the above described mechanism an oscillating motion is imparted to both forming rollers so that they alternately assume the divergent non-operating position shown in dotted lines, or the operating position shown in full lines in which latter position they contact and constrict the glass tube, in its plastic state to the shape shown in Figure 5. The cooling of the pre-forming rollers is done by oil from the duct 125 of the oil container 126 fixed on the support 127.

After the pre-forming or constricting operation, during which the glass tube has cooled down appreciably, the glass tube passes on to the burner 128 at the station G and is subjected to intensive heating, the amount of heat applied being increased at the next station H by the burners 129, which has the effect of melting off the constricted neck of the tube and providing the tube with the semi-globular or rounded bottom as shown in Figure 8. The tube is then passed on to station J for the final bottom forming operation.

The bottom forming tool, shown in Figure 7 comprises the vertical plunger rod 130 provided with the forming mold 131, the interior of which is a recess conforming with the required exterior shape of the bottom of the glass tube.

The plunger rod 130 is slidable in the vertical support 132 and is actuated by the bell-crank 133 fulcrummed in the bracket 134 below the table plate 12. Link 135 connects the bell crank with the slidable collar 136 on the plunger shaft, the lifting action of the bell crank being resiliently transmitted to the plunger shaft by the coil spring 137 interposed between the slidable collar 136 and the fixed collar 138.

The bell crank is actuated by the cam 139 on the main shaft 20. The plunger shaft is provided with the bracket 140 which is arranged in spaced relation to the bracket plate 141 integral with the support 132. The head of the screw 142, which has passage through the bracket plate 140 limits the upward travel of the plunger while the screw 143 which is also threaded on the lower bracket plate 141 and projects upward intermediate the two plates limits the downward stroke of the plunger. Both screws are held in position by lock-nuts which enables the operator to adjust the limits of travel of the plunger. The springs 147 (of which there is one at each side of the plunger) are interposed between the bracket 140 and the support 132 for the purpose of retracting the plunger on the down stroke during which compression of the spring 137 is naturally diminished.

The bottom forming tool above described is pre-heated by the single jet flame of the burner 144; it being important that throughout the bottom forming operation the proper degree of plasticity should be maintained. Localized heat concentration in the mold is prevented by a small quantity of oil dripped into the tool from the duct 145 of the oil container 146. Figure 9 shows the bottom of the glass tube at the end of the bottom-forming operation just prior to the retraction of the tool.

After the bottom forming operation is completed the tube passes to the burners 148 and 149 at stations K and L for gradual de-heating and subsequently passes to station M for unloading, which, as already explained is effected by the automatic opening of the chuck by the lifting rail 80.

Among the new features of this machine is the device for constricting the tube prior to the cutting off of the end of the tube. The constriction enables the bottom portion below the constriction to be readily cut off by the flame and at the same time the flame closes the bottom of the tube into a rounded or half globular shape as shown in Figure 8. This rounded shape is essential to the flat bottom forming operation as the glass must be of the correct preliminary shape and thickness of glass to the globular bottom. When the direction and the intensity of the flame jets are properly adjusted the amount of glass in the rounded bottom can be controlled. Too much glass in the bottom when pressed into the bottom-forming mold will spoil the apearance of the product and also cause internal stresses. Such stresses will also be present when the glass in the bottom is too thin and the tube will develop cracks at the corners or rims of the bottom in subsequent cooling. The adjustment and direction of the flame or flames is therefor made in accordance with the operator's knowledge of the kind and thickness of glass.

The flat bottom or other form of mold is automatically operated and as it co-operates with the regulated mechanical form of holding means for the tube submits each blank to the same pressure and a uniformity of shape and density of each product is the result.

I claim:

A tube forming device comprising a bracket, shafts jourxalled in said bracket in spaced, parallel relation, hubs fixed to said shafts, shafts fixed to said hubs, idler rollers rotatably mounted on the ends of the last mentioned shafts, intermeshing gears fixed to the first mentioned shafts, means engaging one of said gears to actuate the same to oscillate the idler rollers relative to each other, and means in said device spaced from and medially aligned with said bracket to position a glass tube intermediate said rollers, the parts being so juxtaposed that said rollers may circumferentially engage said tube at diametrically opposed points to form the latter on oscillation of said rollers.

CHARLES EISLER.

REFERENCES CITED

The following references are of record in the file of this patent:

UNITED STATES PATENTS

| Number | Name | Date |
|---|---|---|
| 621,794 | Colburn | Mar. 28, 1899 |
| 1,034,419 | Catucci | Aug. 6, 1912 |
| 1,330,707 | Hoffstetter et al. | Feb. 10, 1920 |
| 1,532,077 | Quackenbush et al. | Mar. 31, 1925 |
| 1,735,027 | Wetmore | Nov. 12, 1929 |
| 1,816,280 | Dawson et al. | July 28, 1931 |
| 1,914,205 | Hooper et al. | June 13, 1933 |
| 1,981,692 | Dichter | Nov. 20, 1934 |
| 2,101,213 | Dichter | Dec. 7, 1937 |

FOREIGN PATENTS

| Number | Country | Date |
|---|---|---|
| 282,057 | Great Britain | Mar. 22, 1928 |